US008040844B2

(12) United States Patent
Olexa et al.

(10) Patent No.: US 8,040,844 B2
(45) Date of Patent: Oct. 18, 2011

(54) WIRELESS COMMUNICATIONS APPARATUS AND METHODS EMPLOYING OPPORTUNISTIC FREQUENCY BAND USE

(75) Inventors: George Ronald Olexa, Gainesville, GA (US); Rajendra Singh, Alexandria, VA (US)

(73) Assignee: Telecom Ventures, L.L.C., Alexandria, VA (US)

( * ) Notice: Subject to any disclaimer, the term of this patent is extended or adjusted under 35 U.S.C. 154(b) by 962 days.

(21) Appl. No.: 11/938,978

(22) Filed: Nov. 13, 2007

(65) Prior Publication Data

US 2008/0117871 A1    May 22, 2008

Related U.S. Application Data

(60) Provisional application No. 60/866,523, filed on Nov. 20, 2006.

(51) Int. Cl.
*H04W 4/00* (2009.01)
(52) U.S. Cl. ...................................................... 370/329
(58) Field of Classification Search .................. 370/329, 370/204, 208, 203, 347, 321, 341, 294, 314, 370/345, 442, 444, 468; 455/67.1
See application file for complete search history.

(56) References Cited

U.S. PATENT DOCUMENTS 6,404,748 B1 * 6/2002 Nakamura .................... 370/314
7,218,950 B2 * 5/2007 Qiu et al. ...................... 455/522
7,349,665 B1 * 3/2008 Zhu et al. ..................... 455/11.1
7,420,915 B2 * 9/2008 Murakami et al. ............ 370/204
2004/0176033 A1   9/2004 Tamaki et al.

FOREIGN PATENT DOCUMENTS

WO    WO 2006/043242 A1    4/2006

OTHER PUBLICATIONS

International Search Authority International Search Report and Written Opinion for PCT Application PCT/US2007/023778 mailed Apr. 29, 2008.
Shrader et al., "Power Control-Based Band Allocation in MultiBand CDMA", Globecom 01 2001 IEEE Global Telecommunications Conference, San Antonio, TX, USA, Nov. 25-29, 2001 IEEE Global Telecommunications Conference, New York, NY, IEEE, US, vol. 5 of 6, Nov. 25, 2001, pp. 3306-3310.

* cited by examiner

*Primary Examiner* — Chi Pham
*Assistant Examiner* — Alexander Boakye
(74) *Attorney, Agent, or Firm* — Myers Bigel Sibley & Sajovec, P.A.

(57) ABSTRACT

A base station selectively communicates with terminals using first and second separately allocated frequency bands, e.g., separate cellular/PCS bands, of a government spectrum allocation based on propagation conditions between the base station and the terminals. The base station may transmit in the first frequency band and receive in the second frequency band during a first time slot and transmit in the second frequency band and receive in the first frequency band during a second time slot. The base station may transmit to a terminal in the first frequency band while receiving from the terminal in the second frequency band during the first time slot and may transmit to the first terminal in the second frequency band while receiving from the first terminal in the first frequency band during the second time slot.

15 Claims, 3 Drawing Sheets

WIRELESS COMMUNICATIONS APPARATUS AND METHODS EMPLOYING OPPORTUNISTIC FREQUENCY BAND USE

RELATED APPLICATION

The present application claims the benefit of U.S. Provisional Patent Application Ser. No. 60/866,523, filed Nov. 20, 2006 and incorporated herein by reference in its entirety as if the text thereof were physically present.

FIELD OF THE INVENTION

The present invention relates to communications methods and apparatus and, more particularly, to methods and apparatus and computer program products for wireless communications.

BACKGROUND OF THE INVENTION

Wireless communications systems are now widely used for voice and data communications applications. A variety of different types of devices may be used with a wireless (e.g., cellular) network, including, but not limited to mobile terminals, notebook computers or personal digital assistants (PDAs) with built-in wireless transceivers, and peripheral devices, such as wireless broadband cards, that may be used to provide wireless communications for computers and other electronic device.

Conventional implementations are typically band specific. In particular, even if a carrier or wireless network provider (like a cellular or PCS operator) owns frequency allocations in multiple bands (for example 800 MHz cellular and 1800 MHz PCS), each system typically is designed to operate independently and carry out communication within one band segment, e.g., either the 800 MHz allocation or the 1800 MHz allocation. Multi-band systems have also been designed that can switch between the diverse bands at different times.

Different performance characteristics apply to different frequency bands. In general, all other considerations being equal, higher frequency signals generally provide shorter propagation distances. Lower frequency signals also generally perform better in non line of sight conditions due to their diffraction propagation characteristics.

Other techniques may be used to control signal propagation. For example, in wireless broadband data networks, more bandwidth may be available to users who have the best signal to noise (S/N) margins. As the signal strength falls, these broadband systems may reduce modulation complexity and/or increase the amount of error correction in order to maintain a communication channel. As the modulation complexity is reduced, the throughput is generally equally reduced. Similarly, as the amount of coding is increased to provide more error correction, the overhead may consume more of the capacity of the channel, leaving less capacity for actual information. This may also reduce the throughput of the channel.

SUMMARY OF THE INVENTION

Some embodiments of the present invention provide methods of operating a base station of a wireless communications system. In some embodiments, a base station selectively communicates with terminals using first and second separately allocated frequency bands of a government spectrum allocation based on propagation conditions between the base station and the terminals. The frequency bands may be separated such that they have a propagation difference of at least about 2.75 dB. In some embodiments, the first frequency band is lower than the second frequency band, and selectively communicating with terminals using first and second separately allocated frequency bands includes transmitting in the first frequency band up to a first maximum power level and transmitting in the second frequency band up to a second maximum power level greater than the first maximum power level. In further embodiments, selectively communicating with terminals using first and second separately allocated frequency includes transmitting to a first terminal in the second frequency band at a power level greater than the first maximum power level if a signal propagation condition for communications with the first terminal is inferior to a predetermined criterion and transmitting to a second terminal in the first frequency band at a power level less than or equal to the first maximum power level if a signal propagation condition for communications with the second terminal is superior to the predetermined criterion. The methods may further include receiving from the first terminal in the first frequency band and receiving from the second terminal in the first frequency band or the second frequency band.

In further embodiments, selectively communicating with terminals using first and second separately allocated frequency bands includes transmitting in the first frequency band and receiving in the second frequency band during a first time slot and transmitting in the second frequency band and receiving in the first frequency band during a second time slot. Selectively communicating with terminals using first and second separately allocated frequency bands may also include transmitting to a first terminal in the first frequency band while receiving from the first terminal in the second frequency band during the first time slot and transmitting to the first terminal in the second frequency band while receiving from the first terminal in the first frequency band during the second time slot. Selectively communicating with terminals using first and second separately allocated frequency bands may further include transmitting to a second terminal in the first frequency band without receiving from the second terminal during the first time slot and receiving from the second terminal in the first frequency band without transmitting to the second terminal during the second time slot.

Further embodiments of the present invention provide a wireless communications system including a base station and a controller configured to cause the base station to selectively communicate with terminals using first and second separately allocated frequency bands of a government spectrum allocation based on propagation conditions between the base station and the terminals. Additional embodiments provide a wireless terminal including a radio transceiver configured to communicate in first and second separately allocated frequency bands of a government spectrum allocation and a controller configured to cause the radio transceiver to support selective communication with a base station in the first and second frequency bands based on propagation conditions between the base station and the terminals.

DETAILED DESCRIPTION OF EMBODIMENTS OF THE INVENTION

Figure 1:
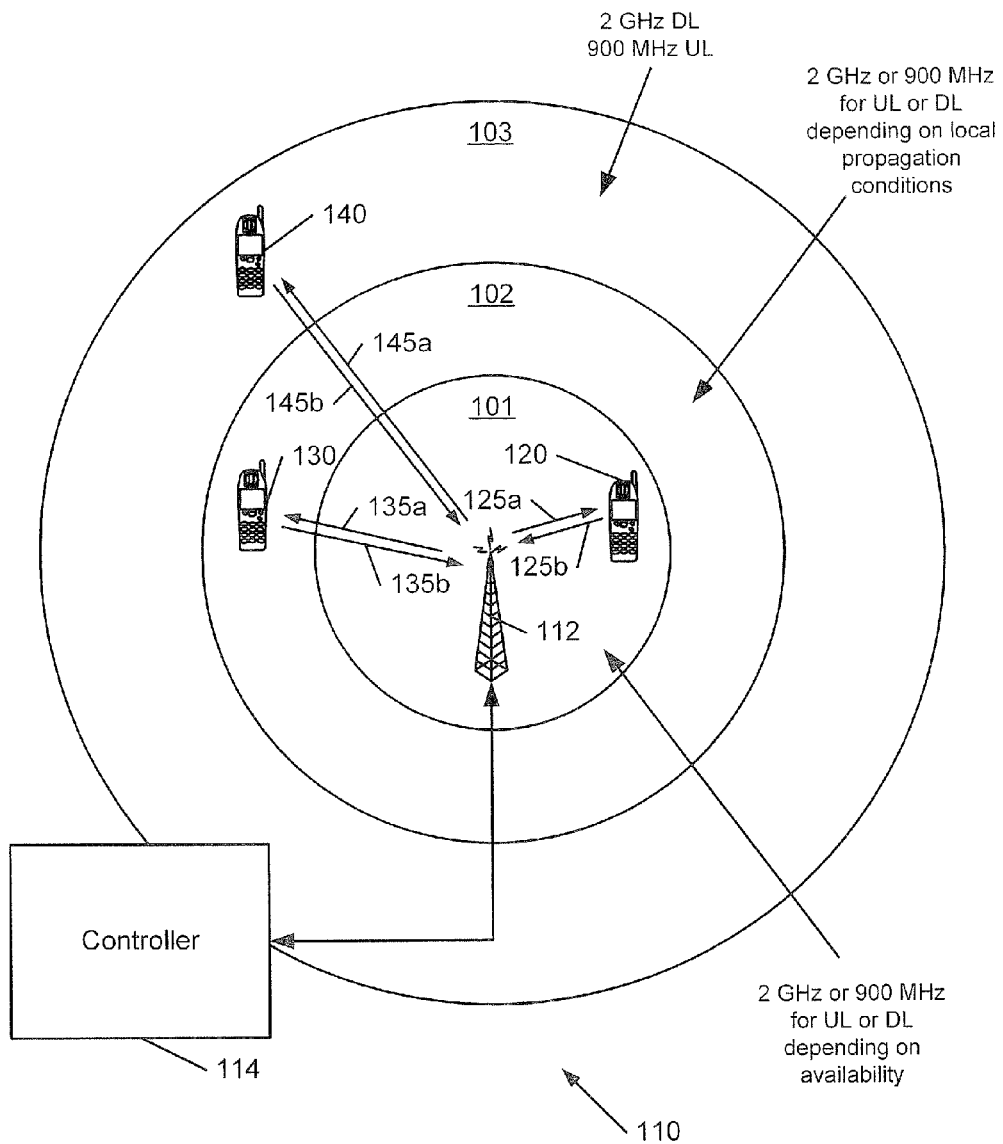
FIG. 1 is a schematic diagram illustrating a wireless communications system according to some embodiments of the present invention.

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, like designations refer to like elements. It will be understood that when an element is referred to as being "connected" or "coupled" to another element, it can be directly connected or coupled to the other element or intervening elements may be present. Furthermore, "connected" or "coupled" as used herein may include wirelessly connected or coupled.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first element below could be termed a second element, and similarly, a second element may be termed a first element without departing from the teachings of the present invention. As used herein, the term "and/or" includes any and all combinations of one or more of the associated listed items. The symbol "/" is also used as a shorthand notation for "and/or".

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flowchart and/or block diagram block or blocks.

The computer program instructions may also be loaded onto a computer or other data processing apparatus to cause a series of operational steps to be performed on the computer or other programmable apparatus to produce a computer implemented process such that the instructions which execute on the computer or other programmable apparatus provide steps for implementing the acts specified in the flowchart and/or block diagram block or blocks.

It should also be noted that in some alternate implementations, the functions/acts noted in the flowchart blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts may be separated into multiple blocks and/or the functionality of two or more blocks of the flowcharts may be at least partially integrated.

As used herein, the term(s) "terminal," "customer provided equipment (CPE)", "radiotelephone", "radioterminal", "wireless terminal", "handset" and/or "terminal" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and a pager, Internet/intranet access, Web browser, organizer, calendar and/or a global positioning system (GPS) receiver; and/or conventional laptop and/or palmtop computers or other appliances, which include a radio frequency transceiver, and also include(s) any other radiating user device/equipment/source that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s). Moreover, a link from a base station (BS) to a terminal may be referred to as a forward link (FL) or downlink (DL) and a link from a terminal to a base station may be referred to as a reverse link, return link (RL) or uplink (UL).

Some embodiments of the invention can provide wireless communication systems, devices and methods by which range and/or capacity can be increased or maximized through the use of multiple frequency bands, licensed and/or unlicensed, and incorporate the ability to allow the systems, devices and methods to use diverse bands, including licensed and/or unlicensed bands, simultaneously.

Some embodiments of the present invention arise from a realization that, by utilizing two or more separate service bands defined in a regulatory scheme for a single system instead of providing separate systems for each band, a system may increase or maximize system efficiency, handset battery life, range, and/or capacity by using the spectrum in an efficient manner. For example, using frequency bands that have a propagation difference of at least about 2.75 dB (for example, frequency bands that differ by at least about one-half octave) can allow a system to tailor uplink and downlink to the maximum power capabilities of base stations and/or terminals. For example, the following licensed and bands may be used in various combinations in some embodiments of the present invention: 450 MHz (licensed), 700 MHz (licensed), 800 MHz Cellular (licensed), 800 and 900 MHz SMR (licensed), 900 MHz LMS (licensed), 1.4 GHz (licensed), 1.6/2.1 GHz AWS (licensed), 1.8 and 1.9 GHz PCS (licensed), 2.3 GHz (licensed), 2.5 to 2.6 GHz (licensed), 3.2-3.6 GHz (licensed), 900 MHz (unlicensed), 2.4 GHz (licensed), and 5.8 GHz (licensed).

For example, some embodiments of the present invention may be realized in a system having access to 10 MHz of 900 MHz spectrum and 30 MHz of 2 GHz spectrum. In the 900 MHz spectrum, a base station (BS) may have a maximum transmit power of, for example, 30 Watts (W), while the terminal has a maximum power of, for example, 1 W. In the 2 GHz spectrum, the BS 112 may have maximum power of 480 W, while terminals may be limited to 1 W. Terminal power may be limited, for example, due to human RF exposure and battery power limitations.

In this example, the 2 GHz frequencies can provide the maximum forward link (i.e., BS to terminal) range. However, the 900 MHz frequencies may generally provide a superior return path (terminal to BS) over a significant portion of the coverage area, due to the fact that, other factors being equal, the propagation characteristics of 900 MHz generally are superior to those of 2 GHz by about 6 dB, i.e., free space loss (FSL)=36.6+20 LOG(Frequency in MHz)+20 LOG(Distance in miles). Conversely, the 900 MHz frequencies, when used for BS to terminal communications, may generally fall short on coverage range due to limited maximum operating power.

In some embodiments illustrated in FIG. 1, a wireless communications system 100 includes a BS 112 controlled by a controller 114. It will be appreciated that the system 100 may include more than one such BS 112 and/or controller 114, e.g., a plurality of BSs may be geographically distributed to provide cellular coverage over a geographical region. The controller 114 may include, for example, circuitry located at a base station site and/or circuitry located elsewhere and linked to a base station site via a wireline, fiber optic, microwave or other network. For example, the controller 114 may be embodied in a mobile switching center (MSC) or other cellular infrastructure component.

In an inner area 101 close to the BS 112, either the 900 MHz or the 2 GHz band may provide acceptable performance for uplinks and downlinks for a terminal 120, and the selected band(s) of operation could be based on availability, throughput requirements (e.g., assign high bandwidth users to the widest channel), battery conservation in portable devices (e.g., assign portables 900 MHz channels in order to reduce transmit power out requirements), or other factors. Accordingly, in this region, the controller 114 may cause the BS 110 to communicate with the terminal 120 using either or both of the 900 MHz and 2 GHz bands based on such factors.

Just beyond the inner area 101, there is a middle area 102 where local terrain and morphology may provide area specific propagation conditions that can influence the desired frequency band to use for both uplink and downlink for a terminal 130, i.e., opportunistic use of the frequencies. For example, the controller 114, BS 112 and/or terminal 130 may monitor the signal strength, bit error rate (BER), noise floor, or other measure of propagation conditions, and may determine, based on these factors and the type of communication desired, which frequencies to use for uplink and/or downlink. Because of changes in path loss associated with a moving terminal, the determination of best band may need to be made on a frame-by-frame or other repeated and/or periodic basis.

Still referring to FIG. 1, beyond the middle area, there is an outer area 103 where the 900 MHz system may not have sufficient power to support a downlink path to a terminal 140, and all or almost all downlink communication to the terminal 140 may be accomplished on the 2 GHz frequencies at power levels above the maximum power for the 900 MHz band. A 6 dB propagation benefit may arise from use of the 900 MHz band may make 900 MHz the desired frequency for uplink communication from the terminal 130 to the BS 112. Being able to operate at a 6 dB better margin means that the 900 MHz frequency band may provide a greater bit/Hz throughput than can be provided using the 2 GHz frequency band at the same transmit power level.

It will be understood by those having skill in the art that the inner, middle and outer areas 101,102, 103 are illustrated as concentric circles in FIG. 1 for purposes of illustration but, in other embodiments, the sizes, shapes and extent of these areas may vary from that shown. Moreover, the sizes, shapes and extent of these areas may also vary over time based on propagation conditions, utilization, and other factors.

Figure 2:
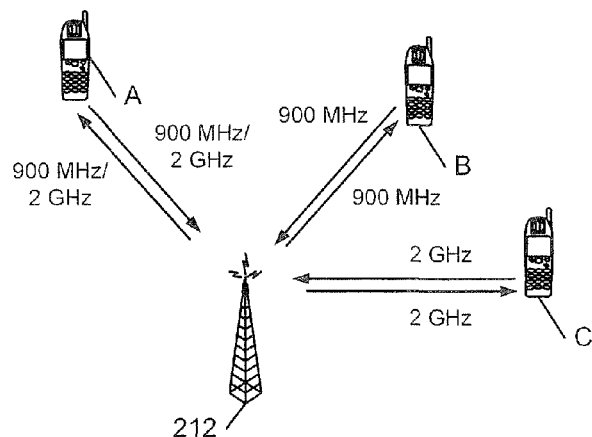
FIG. 2 is a schematic diagram illustrating communications of a wireless base stations with terminals of differing capabilities according to further embodiments of the present invention.
Figure 3:
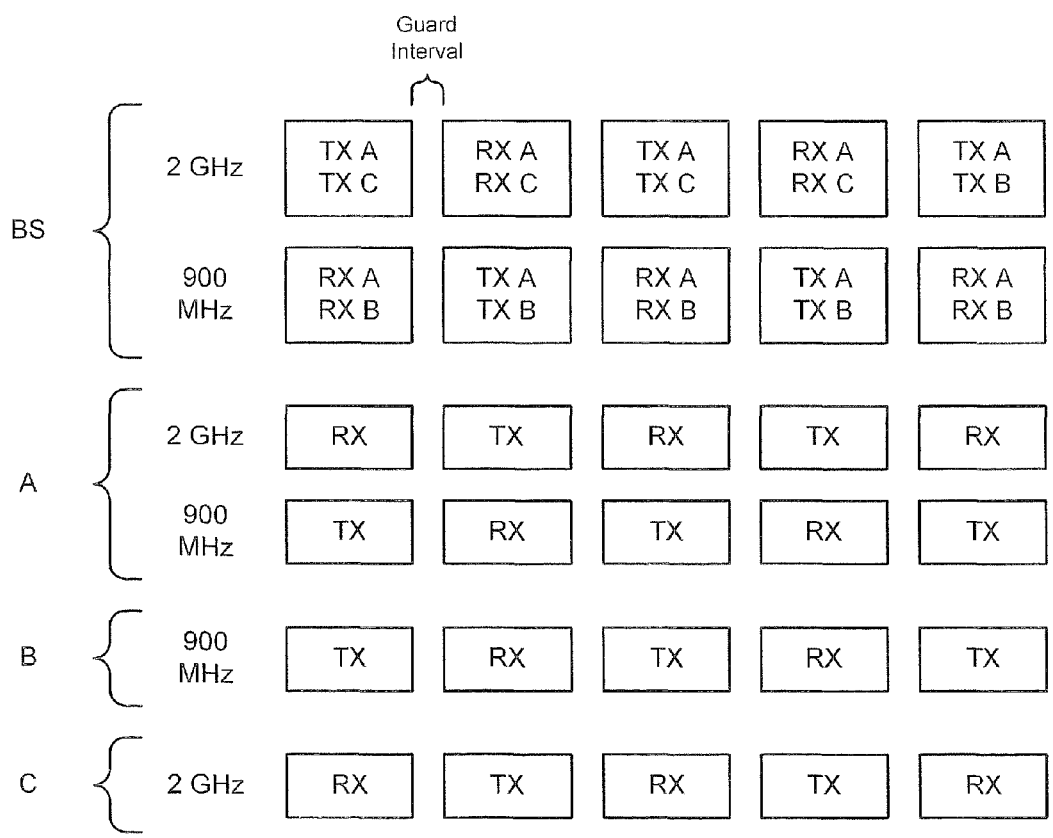
FIG. 3 is a timing diagram illustrating exemplary operations of the base station and terminals of FIG. 2.

According to further embodiments of the present invention, the use of multiple widely spaced frequency bands may enable the provision of full-duplex communications with terminals with an ability to concurrently transmit in one frequency band and receive in the other, while still supporting communications with terminals without such a capability. FIG. 2 is a schematic diagram of a BS 212 supporting communications with three different terminals, a first terminal A capable of transmitting and receiving in 900 MHz and 2 GHz bands, a second terminal B capable of transmitting and receiving in the 900 MHz band, and a third terminal C capable of transmitting and receiving in the 2 GHz band. FIG. 3 is a timing diagram illustrating time division duplex (TDD) operations of the BS and terminals A, B, C according to some embodiments of the present invention.

As shown in FIG. 3, the BS 212 alternately transmits to and receives from terminals A and C in the 2 GHz band in successive time slots, which may be separated by a guard interval. Similarly, the BS alternately receives from and transmits to terminals A and B in the 900 MHz band in successive time slots, with the 900 MHz and 2 GHz time slots being complementary such that the BS transmits in one band while receiving in the other. In this manner, terminal A can conduct full-rate full-duplex communications, while providing simplex communications for terminals B and C.

It will be appreciated that many variations may be used in some embodiments of the present invention. For example, some embodiments may allow partially or fully shifted TDD transmit/receive windows to be used between multiple bands. In still other embodiments of the invention, use of the above referenced time-shifted transmit/receive windows may allow a TDD system to achieve the benefits of a FDD system by allowing the BS and terminal to communicate in a full duplex mode. Other embodiments of the invention can allow using overlapping transmit/receive windows to improve the ability to monitor propagation deltas between bands by the terminal or by location or area by monitoring channel conditions in the field. Yet other embodiments of the invention provide a TDD system that can vary the transmit/receive duty cycle allocations on each band of operation in order to accommodate traffic presented by instantaneous demand placed on the system. Still other embodiments of the invention can allow using TDD transmit/receive window overlap to provide fall usage of 2 bands for communicating at high or maximum throughput to a terminal or BS (BS or terminal is receiving and/or transmitting on both bands during the allocated transmit/received window for each band).

Figure 4:
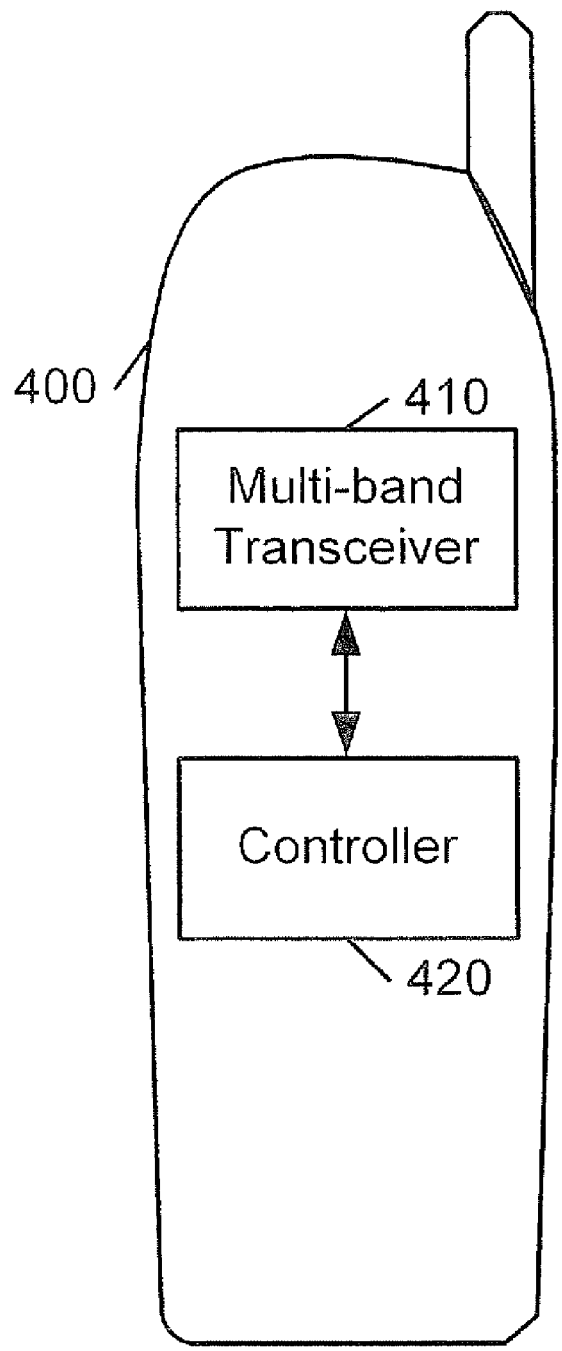
FIG. 4 is a schematic diagram illustrating a wireless terminal according to further embodiments of the present invention.

FIG. 4 illustrates a wireless terminal 400 according to further embodiments of the present invention. The terminal 400 includes a multi-band transceiver 410 capable of transmission and reception in first and second separately allocated bands, e.g., a 900 MHz band and a 2 GHz band. A controller 420 is operatively associated with the radio transceiver 410, and is configured to control the transceiver 410 such that it may support the various communications modes discussed above. For example, the controller 420 may be configured to support selective communications in the first and second frequency bands based on propagation conditions, e.g., by transmitting and receiving on the bands as required by the wireless communications system and providing signal quality monitoring and other functions that support such selective communications. The controller 420 may also be configured to cause the transceiver 410 to provide full-duplex communications as described above with reference to FIG. 3.

In various embodiments, if a terminal is located within the area where it can be equally served by either band (see FIG. 1), portable or other devices with limited battery power can benefit by the use of the lower frequency for their transmit cycle. Because the propagation characteristics of the lower band allow it to provide more signal at the BS receive antenna for the same power, using the lower frequency can allow the terminal to transmit at many dB lower power, thus conserving limited battery resources.

Some embodiments of the invention can provide systems, methods and/or devices (terminal/BS) that commonly coordinate and use all available spectrum both at the BS and at the terminal. A common timing base may be used for coordination of activities in the network. This may be used for transmit/receive window coordination TDD networks, but it may not be needed in FDD networks.

Signal strength, S/N ratio, BER, FER, PER, and/or other indicators of channel behavior may be monitored at the BS and/or terminal. A portion of the overhead communication channel may be utilized to pass this information between the terminal and BS so that each knows the conditions present on both ends of the link. This data, along with the needs of the information to be communicated, may be used in analyzing and determining the desired band or bands to be utilized in the communication. The BS may also weigh the requirements of all or a fraction of the terminals to which it is communicating and make a band allocation to the terminals that improves or optimizes the total traffic and range mix to be served by the BS at that instant and/or over a given time interval. Additionally, the BS and terminal can keep short and/or long term trending data on the condition of used communication paths. This can be used to predict the future need to change bands or the serving BS. Accordingly, some embodiments of the invention can allow multiple widely separated bands to be commonly used by a communication system, method and/or devices for both transmit and receive of communications to and from other stations.

Moreover, other embodiments of the invention can allow opportunistic selection among multiple commonly controlled bands which allow the use of these bands in such a manner as to improve or maximize efficiency of communication used in both the uplink and downlink directions. Efficiency may include but not be limited to: maximizing range, maximizing throughput, maximizing terminal battery life, or other factors.

In the drawings and specification, there have been disclosed exemplary embodiments of the invention. Although specific terms are employed, they are used in a generic and descriptive sense only and not for purposes of limitation, the scope of the invention being defined by the following claims.

What is claimed:

1. A method of operating a base station of a wireless communications system, the method comprising:
   determining propagation conditions between the base station and terminals; and
   selectively communicating with terminals using first and second separately allocated frequency bands of a government spectrum allocation based on the determined propagation conditions between the base station and the terminals, wherein the first frequency band is lower than the second frequency band, and wherein selectively communicating with terminals using first and second separately allocated frequency bands comprises transmitting in the first frequency band up to a first maximum power level and transmitting in the second frequency band up to a second maximum power level greater than the first maximum power level.

2. The method of claim 1, wherein selectively communicating with terminals using first and second separately allocated frequency comprises:
   transmitting to a first terminal in the second frequency band at a power level greater than the first maximum power level if a signal propagation condition for communications with the first terminal is inferior to a predetermined criterion; and
   transmitting to a second terminal in the first frequency band at a power level less than or equal to the first maximum power level if a signal propagation condition for communications with the second terminal is superior to the predetermined criterion.

3. The method of claim 2, further comprising:
   receiving from the first terminal in the first frequency band; and
   receiving from the second terminal in the first frequency band or the second frequency band.

4. The method of claim 1, wherein a propagation difference between the first and second frequency bands is at least about 2.75 dB.

5. A method of operating a base station of a wireless communications system, the method comprising:
   determining propagation conditions between the base station and terminals; and
   selectively communicating with terminals using first and second separately allocated frequency bands of a government spectrum allocation based on the determined propagation conditions between the base station and the terminals, wherein selectively communicating with terminals using first and second separately allocated frequency bands further comprises:
   transmitting to a first terminal in the first frequency band while receiving from the first terminal in the second frequency band during a first time slot; and
   transmitting to the first terminal in the second frequency band while receiving from the first terminal in the first frequency band during a second time slot.

6. The method of claim 5, wherein selectively communicating with terminals using first and second separately allocated frequency bands further comprises:
   transmitting to a second terminal in the first frequency band without receiving from the second terminal during the first time slot; and
   receiving from the second terminal in the first frequency band without transmitting to the second terminal during the second time slot.

7. The method of claim 5, wherein the first and second time slots are separated by a guard time.

8. A wireless communications system, comprising:
   a base station; and
   a controller configured to determine propagation conditions between the base station and terminals and to cause the base station to selectively communicate with terminals using first and second separately allocated frequency bands of a government spectrum allocation based on the determined propagation conditions between the base station and the terminals, wherein the first frequency band is lower than the second frequency band, and wherein the base station is configured to transmit in the first frequency band up to a first maximum power level and to transmit in the second frequency band up to a second maximum power level greater than the first maximum power level.

9. The system of claim 8, wherein the controller is configured to cause the base station transmit to a first terminal in the second frequency band at a power level greater than the first maximum power level if a signal propagation condition for communications with the first terminal is inferior to a predetermined criterion and to transmit to a second terminal in the first frequency band at a power level less than or equal to the first maximum power level if a signal propagation condition for communications with the second terminal is superior to the predetermined criterion.

10. The system of claim 9, wherein the controller is further configured to cause the base station to receive from the first terminal in the first frequency band and to receive from the second terminal in the first frequency band or the second frequency band.

11. The system of claim 8, wherein a propagation difference between the first and second frequency bands is at least about 2.75 dB.

12. A wireless communications system, comprising:
a base station; and
a controller configured to determine propagation conditions between the base station and terminals and to cause the base station to selectively communicate with terminals using first and second separately allocated frequency bands of a government spectrum allocation based on the determined propagation conditions between the base station and the terminals, wherein the controller is configured to cause the base station to transmit to a first terminal in the first frequency band while receiving from the first terminal in the second frequency band during a first time slot and to transmit to the first terminal in the second frequency band while receiving from the first terminal in the first frequency band during a second time slot.

13. The system of claim 12, wherein the controller is configured to cause the base station to transmit to a second terminal in the first frequency band without receiving from the second terminal during the first time slot and to receive from the second terminal in the first frequency band without transmitting to the second terminal during the second time slot.

14. The system of claim 12, wherein the first and second time slots are separated by a guard time.

15. A wireless terminal comprising:
a radio transceiver configured to communicate in first and second separately allocated frequency bands of a government spectrum allocation; and
a controller configured to cause the radio transceiver to support selective communication with a base station in the first and second frequency bands based on propagation conditions between the base station and the terminals, wherein the controller is configured to cause the radio transceiver to transmit in the first frequency band and to receive in the second frequency band during a first time slot and to transmit in the second frequency band and receive in the first frequency band during a second time slot.

* * * * *

UNITED STATES PATENT AND TRADEMARK OFFICE
CERTIFICATE OF CORRECTION

| | | |
|---|---|---|
| PATENT NO. | : 8,040,844 B2 | Page 1 of 1 |
| APPLICATION NO. | : 11/938978 | |
| DATED | : October 18, 2011 | |
| INVENTOR(S) | : Olexa et al. | |

It is certified that error appears in the above-identified patent and that said Letters Patent is hereby corrected as shown below:

Column 6, Line 57: Please correct "provide fall" to read -- provide full --

Signed and Sealed this
Thirty-first Day of January, 2012

David J. Kappos
*Director of the United States Patent and Trademark Office*